Jan. 22, 1924.  1,481,664
A. C. DICKINSON
HEADBLOCK FOR SAW CARRIAGES
Filed July 7, 1922
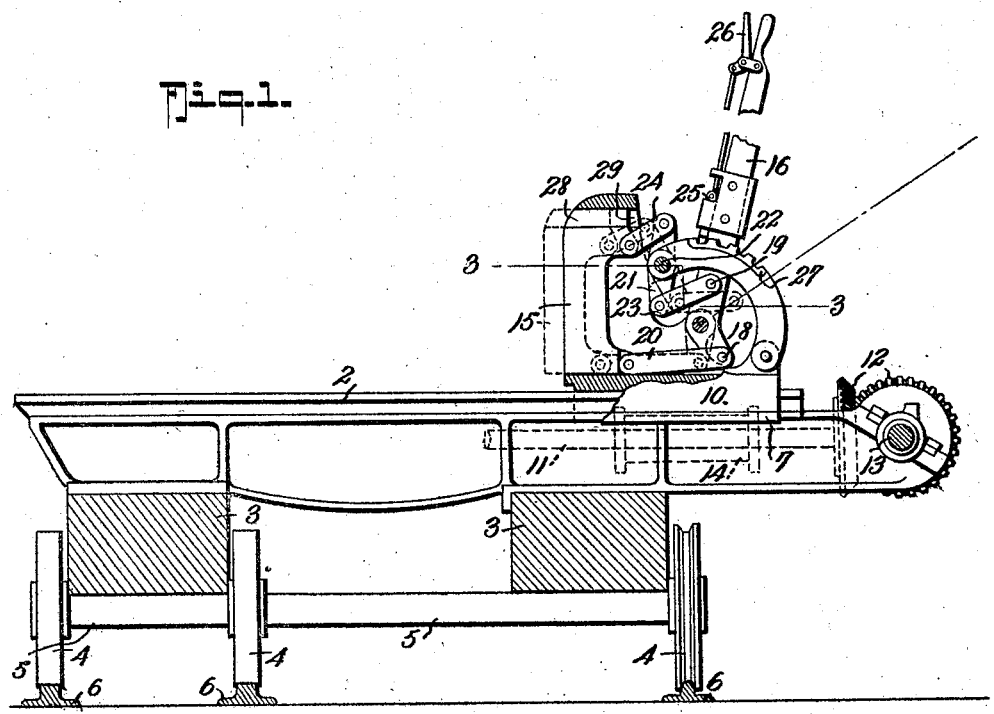
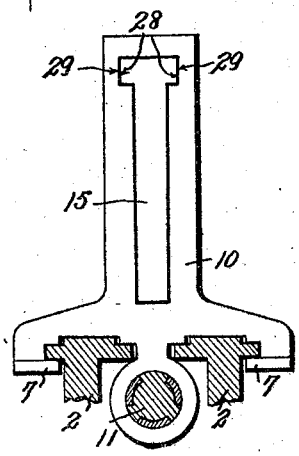
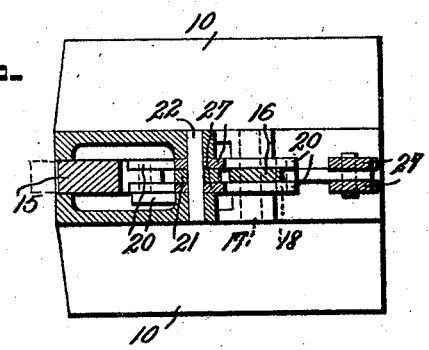
Inventor
Aaron C. Dickinson.
By Fred G. Dieterich
Attorneys Patented Jan. 22, 1924.

1,481,664

UNITED STATES PATENT OFFICE.

AARON C. DICKINSON, OF FRASER MILLS, BRITISH COLUMBIA, CANADA.

HEADBLOCK FOR SAW CARRIAGES.

Application filed July 7, 1922. Serial No. 573,396.

*To all whom it may concern:*

Be it known that I, AARON C. DICKINSON, citizen of the United States, residing at Fraser Mills, in the Province of British Columbia, Canada, have invented certain new and useful Improvements in Headblocks for Saw Carriages, of which the following is a specification.

This invention relates to an adjustable face for the head-block of a saw carriage designed to enable one end of a log on the carriage to be set forward in advance of the other to enable a tapered cut to be made from the log.

The invention is particularly described in the following specification, reference being made to the drawings by which it is accompanied, in which:

Fig. 1 is an end view of the log carriage showing the head-block in vertical section with the adjustable face which is the particular subject of this application.

Fig. 2 is an enlarged detail in longitudinal cross section on the nut and its screw in relation to the head-block.

Fig. 3 is a cross section of the same on the line 3—3 in Fig. 2.

In these drawings 2 represents one of the transverse girders or bed plates of the log carriage, which girders are supported on and across longitudinals 3 mounted on the axles 5 of wheels 4 to run on the rails 6, parallel to the plane of the saw plate.

The head-block 10 is mounted to move endwise on the upper face of its bed plate 2 and engages the edges of the upper flange thereof with retaining strips 7 engaging the underside of the same.

The head-block 10 is endwise moved on the cross girder 2 by a screw 11 rotatably mounted in the middle line of each girder 2 and driven by mitre gears 12 from a shaft 13 extending lengthwise of the carriage. This screw 11 passes through a nut 14 retained against endwise and rotational movement in the head-block.

The shaft 13 is rotated in any approved manner to simultaneously advance or recede the several head-blocks of the carriage. It is to enable the face of any one or more of the head-blocks, against which the log to be sawn is dogged, to be advanced beyond the normal face of the block that the device, which is the subject of this application, has been devised.

That portion of the head-block 10, which projects above the carriage and which bears against the log to set it forward to the saw, is cored from back to front through the intermediate portion of its depth above the bed plate 2 to receive the adjustable face member 15 which is the particular subject of this application and permit it to be slidably movable therein.

This adjustable face member 15 is moved within the block 10 to project its outer face beyond the face of the head-block when required, and is retained in any desired position of adjustment in relation thereto by a lever 16 which is movable about a pin 17 extending between the sides of the head-block.

This lever 16 is extended for a short distance below its fulcrum pin 17, and the lower end is connected at 18 by a link 20 directly to the lower end of the adjustable face member 15. At 19, above the fulcrum pin 17, a link 23 connects the same lever 16 to the lower end of a short reversing lever 21 fulcrumed at 22 to the head-block. The upper end of this reversing lever 21 is connected by a link 24 to the upper end of the adjustable face member 15.

The distances of the pin-connection of the links 23 and 24 from the pivot pin of the lever 21 are proportioned in relation to the distances of the pins 18 and 19 from the fulcrum pin 17 of the lever 16 to move the upper and lower ends of the face member 15 substantially the same amount in the same direction. In the drawing the distances of these pin-connections from their respective fulcrum pins are shown as equal.

Movement backward of the upper end of the lever 16 will thus advance the adjustable face member 15, the lower end by forward movement of the lower end of the lever below the fulcrum pin 17, and the upper end by backward movement of the lever above the fulcrum, reversed in direction by the lever 21.

The face member 15 is retained in any desired position of adjustment by a bolt 25 slidably mounted on the edge of the lever 16, which bolt engages one of a series of notches in a segment 27 secured to the head-block to be concentric with the pin 17 of the lever, and this bolt is raised or lowered by a grip lever 26 adjacent the handle of the lever 16.

To relieve to some extent the connecting pins of the actuating mechanism of any shock of a log rolling against the adjustable face 15, the upper end of it is supported in the head-block 10 by lateral projections 28 running from back to front of the block along each side of its upper end, which projections fit corresponding grooves 29 provided in the cored slot.

In use, the adjustable head-block face does not interfere in any way with free action of the head-block, as such, but when it is required to cut a tapered board from the log one end of the log may be set forward in advance of the other end by pulling the lever 16 outward the required amount, and notching it in that position.

The device forms a convenient accessory to a log carriage. It is simple in construction, and direct in operation, and in the position of use, the operating links are practically straight in the direction of imposed strain.

Having now particularly described my invention, I hereby declare that what I claim as new and desire to be protected in by Letters Patent, is:

1. An adjustable face for a saw carriage head-block, said face comprising the combination with a head-block having a space extending from front to back through its width, and from adjacent the top to adjacent the bottom, an adjustable face member slidably mounted within said space, means for projecting this face member from the front face of the head-block and for withdrawing it within the same, and means for securing it in any desired position of adjustment.

2. An adjustable face for a saw carriage head-block, said face comprising the combination with a head-block having a space extending from front to back through its width, and from adjacent the top to adjacent the bottom, an adjustable face member slidably mounted within said space, said adjustable face member having lateral projections from front to back along both edges adapted to engage corresponding grooves in the head-block, means for projecting this face member from the front face of the head-block and for withdrawing it within the same, and means for securing it in any desired position of adjustment.

3. An adjustable face for a saw carriage head-block, comprising the combination with a head-block, of an adjustable face member slidably mounted therein, means for projecting this member from and withdrawing it within the normal face of the head-block, said means comprising a handled lever pivotally mounted adjacent one end to the head-block, and means for connecting the upper and lower ends of the adjustable face member to the handled lever on opposite sides of its fulcrum pin to move the face member forward and backward parallel to the face of the head-block, and means for securing the mechanism at any desired position of adjustment of the face member.

4. An adjustable face for a saw carriage head-block, of an adjustable face member slidably mounted within the head-block to move its front face forward in advance of the normal face of the block, a lever pivotally mounted to the back of the head-block, means for securing the lever in any desired position of adjustment, a link between the lower end of said lever and the lower portion of said adjustable face member, a supplemental lever pivotally mounted on the back of the head-block, a link between one end of said supplemental lever and the upper portion of said adjustable face member, a link between one end of said supplemental lever and said first mentioned lever, the place of connection of said last mentioned link and said first mentioned lever being above the fulcrum of said first mentioned lever, substantially as shown and described.

5. An adjustable face for a saw carriage head-block comprising the combination with a head-block, of an adjustable face member slidably mounted thereon, said face member having projections from front to back along both upper edges adapted to engage corresponding grooves in the top of the head-block, the top of said head-block above said corresponding grooves being connected from one side wall to the other, means for projecting the adjustable face member from and withdrawing it within the normal face of the head-block and means securing it in any desired position of adjustment.

6. An adjustable face for a saw carriage head-block, comprising the combination with a head-block having a T-slot through the same, said face member having a correspondingly shaped body to fit into said T-slot, the head of said T-slot being adjacent to the top of said head block to leave a connection from one side wall of the head-block to the other across the top of the T-slot, lever and link devices mounted on the head-block centrally thereof and connected to said adjustable face member, the connections passing through said T-slot, substantially as shown and described.

In testimony whereof I affix my signature.

AARON C. DICKINSON.